US010885682B2

(12) United States Patent
Zang et al.

(10) Patent No.: US 10,885,682 B2
(45) Date of Patent: Jan. 5, 2021

(54) METHOD AND DEVICE FOR CREATING INDOOR ENVIRONMENT MAP

(71) Applicant: Beijing Xiaomi Intelligent Technology Co., Ltd., Beijing (CN)

(72) Inventors: Yutong Zang, Beijing (CN); Binglin Chang, Beijing (CN)

(73) Assignee: Beijing Xiaomi Intelligent Technology Co., Ltd., Beijing (CN)

(*) Notice: Subject to any disclaimer, the term of this patent is extended or adjusted under 35 U.S.C. 154(b) by 0 days.

(21) Appl. No.: 16/679,151

(22) Filed: Nov. 9, 2019

(65) Prior Publication Data

US 2020/0380741 A1 Dec. 3, 2020

(30) Foreign Application Priority Data

May 31, 2019 (CN) .......................... 2019 1 0472868

(51) Int. Cl.
*G06T 11/20* (2006.01)
*G06T 7/73* (2017.01)
(Continued)

(52) U.S. Cl.
CPC ................ *G06T 11/20* (2013.01); *G06T 5/10* (2013.01); *G06T 7/50* (2017.01); *G06T 7/73* (2017.01); *G06T 2207/30244* (2013.01)

(58) Field of Classification Search
CPC ... G06T 11/20; G06T 5/10; G06T 7/73; G06T 7/50; G06T 7/579; G06T 7/246;
(Continued)

(56) References Cited

U.S. PATENT DOCUMENTS 10,467,804 B2 * 11/2019 Fleischman .......... H04N 13/204
10,685,446 B2 * 6/2020 Fleishman ........... G06K 9/6296
(Continued)

FOREIGN PATENT DOCUMENTS

CN 108717710 A 10/2018

OTHER PUBLICATIONS

Fuentes-Pacheco Jorge et al: "Visual simultaneous localization and mapping: a survey" Artificial Intelligence Review, Springer Netherlands, NL, vol. 43, No. 113 Nov. 2012 (Nov. 13, 2012), pp. 55-81, XP035419899, ISSN: 0269-2821, DOI:10.1007/S10462-012-9365-8 [ retrieved on Nov. 13, 2012] * section 3 and 6 *.
(Continued)

*Primary Examiner* — Michael S Osinski
(74) *Attorney, Agent, or Firm* — Syncoda LLC; Feng Ma

(57) ABSTRACT

A method includes: acquiring a second initial pose according to obstacle region information and geometric scale information of an indoor architectural structure drawing and a first initial pose; acquiring a first feature point location, a locating error and a first pose through a VSLAM algorithm during movement; acquiring a second pose according to the first pose, first initial pose and second initial pose; acquiring a distance to an obstacle according to the second pose, indoor architectural structure drawing and a ray casting algorithm; acquiring a third pose according to the distance, first feature point location, locating error, first pose and a filtering algorithm; acquiring a second feature point location according to the third pose and VSLAM algorithm; and creating an indoor environment map according to the second feature point location and a key frame set.

20 Claims, 9 Drawing Sheets

(51) Int. Cl.
*G06T 5/10* (2006.01)
*G06T 7/50* (2017.01)

(58) Field of Classification Search
CPC .... G06T 7/55; G06T 7/74; G06T 7/75; G06T 7/11; G06T 7/20; G06T 7/60; G06T 7/97; G06T 2207/30244; G06T 2207/10028; G06T 2207/20076; G06T 2207/10016; G05D 1/0274; G05D 1/0846; G05D 1/0088; G05D 1/027; G05D 1/02; G05D 1/0238; G05D 1/0253; G06K 9/00664; G06K 9/4671; G06K 9/00201; G06K 9/00671; G06K 9/00805; G06K 9/6211; G06K 9/629; G01C 21/206; G01C 21/32; G01C 21/20; G01C 21/12; G01C 21/16; G01C 21/165

See application file for complete search history.

(56) References Cited

U.S. PATENT DOCUMENTS

| | | | |
|---|---|---|---|
| 10,739,142 B2* | 8/2020 | Meier | G06K 9/00691 |
| 10,783,684 B2* | 9/2020 | Wu | G06T 11/00 |
| 2014/0323148 A1 | 10/2014 | Schmalstieg et al. | |
| 2015/0243036 A1* | 8/2015 | Hoffmann | G06T 7/75 382/103 |
| 2015/0310310 A1* | 10/2015 | Hesch | G06K 9/6232 382/103 |
| 2017/0010623 A1* | 1/2017 | Tang | G06K 9/0063 |
| 2017/0052033 A1* | 2/2017 | Fong | G01C 21/32 |
| 2017/0168160 A1* | 6/2017 | Metzler | G01S 5/163 |
| 2017/0213373 A1* | 7/2017 | Yamao | G06T 7/73 |
| 2017/0228940 A1* | 8/2017 | Kutliroff | G06T 7/12 |
| 2018/0005034 A1* | 1/2018 | Kaehler | G06T 7/11 |
| 2018/0321687 A1* | 11/2018 | Chambers | G05D 1/0274 |
| 2019/0050691 A1* | 2/2019 | Lee | G06K 9/6211 |
| 2019/0146521 A1* | 5/2019 | Cui | G05D 1/02 701/23 |
| 2019/0226852 A1* | 7/2019 | Xie | G01C 21/165 |
| 2019/0246600 A1* | 8/2019 | Buijs | A01K 1/0128 |
| 2019/0384318 A1* | 12/2019 | Fuchs | G01S 13/89 |
| 2019/0388781 A1* | 12/2019 | Taylor | A63F 13/847 |
| 2020/0011668 A1* | 1/2020 | Derhy | G06K 9/6211 |
| 2020/0027236 A1* | 1/2020 | Tamama | G06F 3/012 |
| 2020/0033463 A1* | 1/2020 | Lee | G01S 5/0252 |
| 2020/0065432 A1* | 2/2020 | Moller | G01C 1/04 |
| 2020/0116493 A1* | 4/2020 | Colburn | G06T 17/10 |
| 2020/0154095 A1* | 5/2020 | Fleischman | G06K 9/00771 |
| 2020/0218929 A1* | 7/2020 | Li | G06K 9/00744 |
| 2020/0219267 A1* | 7/2020 | Rebecq | G06T 7/20 |
| 2020/0240793 A1* | 7/2020 | Li | G01C 21/32 |
| 2020/0279380 A1* | 9/2020 | Kaneko | G06T 7/246 |
| 2020/0306989 A1* | 10/2020 | Vogel | G05D 1/0261 |
| 2020/0333790 A1* | 10/2020 | Kobayashi | G01C 3/085 |
| 2020/0341486 A1* | 10/2020 | Dia | G05D 1/0274 |
| 2020/0342626 A1* | 10/2020 | Chen | G06T 7/00 |
| 2020/0357177 A1* | 11/2020 | Park | G06T 17/20 |

OTHER PUBLICATIONS

Yihong Wu et al: "Image Based Camera Localization: an Overview", arxiv. org, Cornell University Library, 2010 Lin Library Cornell University Ithaca, NY14853 Oct. 12, 2016 (Oct. 12, 2016), XP081354500,* sections A and B *.

Raúl Mur-Artal, and Juan D. Tardós. ORB-SLAM2: an Open-Source SLAM System for Monocular, Stereo and RGB-D Cameras. 2016.

Raúl Mur-Artal and Juan D. Tardós. Probabilistic Semi-Dense Mapping from Highly Accurate Feature-Based Monocular SLAM. 2015.

Fast Relocalisation and Loop Closing in Keyframe-Based SLAM. 2014.

Bags of Binary Words for Fast Place Recognition in Image Sequences, mailed in Oct. 2012.

European Search Report in the European application No. 19211413. 0, dated Jun. 15, 2020.

* cited by examiner

METHOD AND DEVICE FOR CREATING INDOOR ENVIRONMENT MAP

CROSS-REFERENCE TO RELATED APPLICATION

This application claims priority to Chinese patent application No. 201910472868.4 filed on May 31, 2019, the disclosure of which is hereby incorporated by reference in its entirety.

BACKGROUND

Simultaneous Location and Mapping (SLAM) has been employed for indoor mapping, such as inside a shopping center, a store, an office space, a hotel, a house or an apartment.

SUMMARY

The present disclosure relates generally to the field of Simultaneous Location and Mapping (SLAM), and more particularly, to a method and device for creating an indoor environment map by a Visual SLAM (V SLAM) algorithm.

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to a first aspect of embodiments of the present disclosure, a method for creating an indoor environment map is provided, which can be applied to a terminal and include that: a second initial pose of the terminal in an indoor architectural structure drawing is acquired according to obstacle region information of the indoor architectural structure drawing, geometric scale information of the indoor architectural structure drawing and a first initial pose of the terminal in an indoor environment; a first feature point location in an indoor environment image, a locating error in the indoor environment and a first pose of the terminal in the indoor environment are acquired through a VSLAM algorithm during movement; a second pose corresponding to the first pose of the terminal in the indoor architectural structure drawing is acquired according to the first pose, the first initial pose and the second initial pose; a distance to an obstacle in the indoor architectural structure drawing is acquired according to the second pose, the indoor architectural structure drawing and a ray casting algorithm; a third pose of the terminal in the indoor environment is acquired according to the distance, the first feature point location, the locating error, the first pose and a filtering algorithm; a second feature point location in the indoor environment image is acquired according to the third pose and the VSLAM algorithm; and an indoor environment map is created according to the second feature point location and a key frame set of the indoor environment image.

According to a second aspect of the embodiments of the present disclosure, a device for creating an indoor environment map is provided, which can include: a processor; and a memory configured to store an instruction executable by the processor, wherein the processor can be configured to execute steps of:

acquiring a second initial pose of the terminal in an indoor architectural structure drawing according to obstacle region information of the indoor architectural structure drawing, geometric scale information of the indoor architectural structure drawing and a first initial pose of the terminal in an indoor environment;

acquiring a first feature point location in an indoor environment image, a locating error in the indoor environment and a first pose of the terminal in the indoor environment through a Visual Simultaneous Location and Mapping (VSLAM) algorithm during movement;

acquiring a second pose corresponding to the first pose of the terminal in the indoor architectural structure drawing according to the first pose, the first initial pose and the second initial pose;

acquiring a distance to an obstacle in the indoor architectural structure drawing according to the second pose, the indoor architectural structure drawing and a ray casting algorithm;

acquiring a third pose of the terminal in the indoor environment according to the distance, the first feature point location, the locating error, the first pose and a filtering algorithm;

acquiring a second feature point location in the indoor environment image according to the third pose and the VSLAM algorithm; and creating an indoor environment map according to the second feature point location and a key frame set of the indoor environment image.

According to a third aspect of the embodiments of the present disclosure, a non-transitory computer-readable storage medium is provided, having stored an instruction thereon, when executed by a processor of a mobile terminal, to enable the mobile terminal to execute the method for creating an indoor environment map in the first aspect or any aspect in the first aspect.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments but not intended to limit the present disclosure. "First", "second" and similar terms used in the specification and claims of the present application are not to represent any sequence, number or importance but only to distinguish different parts. Likewise, similar terms such as "a/an" and "the" also do not represent a number limit but represent "at least one." Terms like "include" or "comprise" refer to that an element or object appearing before "include" or "comprise" covers an element or object and equivalent thereof listed after "include" or "comprise" and does not exclude another element or object. It is also to be understood that term "and/or" used in the present disclosure refers to and includes one or any or all possible combinations of multiple associated items that are listed.

A laser SLAM algorithm or a VSLAM algorithm is a commonly used approach of creating a map for an indoor environment of a large area. In this approach, an accumulative error may be made. The accumulative error may cause a serious deformation of the created indoor map relative to a true map, and particularly in a complex environment, the created indoor map may be seriously deformed and is unlikely to be corrected even if being optimized through an existing algorithm. Consequently, the finally created map cannot be used for subsequent navigation or locating.

The embodiments of the present disclosure will be described below in combination with the accompanying drawings in detail. Characteristics in the following embodiments and implementation modes may be combined without conflicts.

Figure 1:
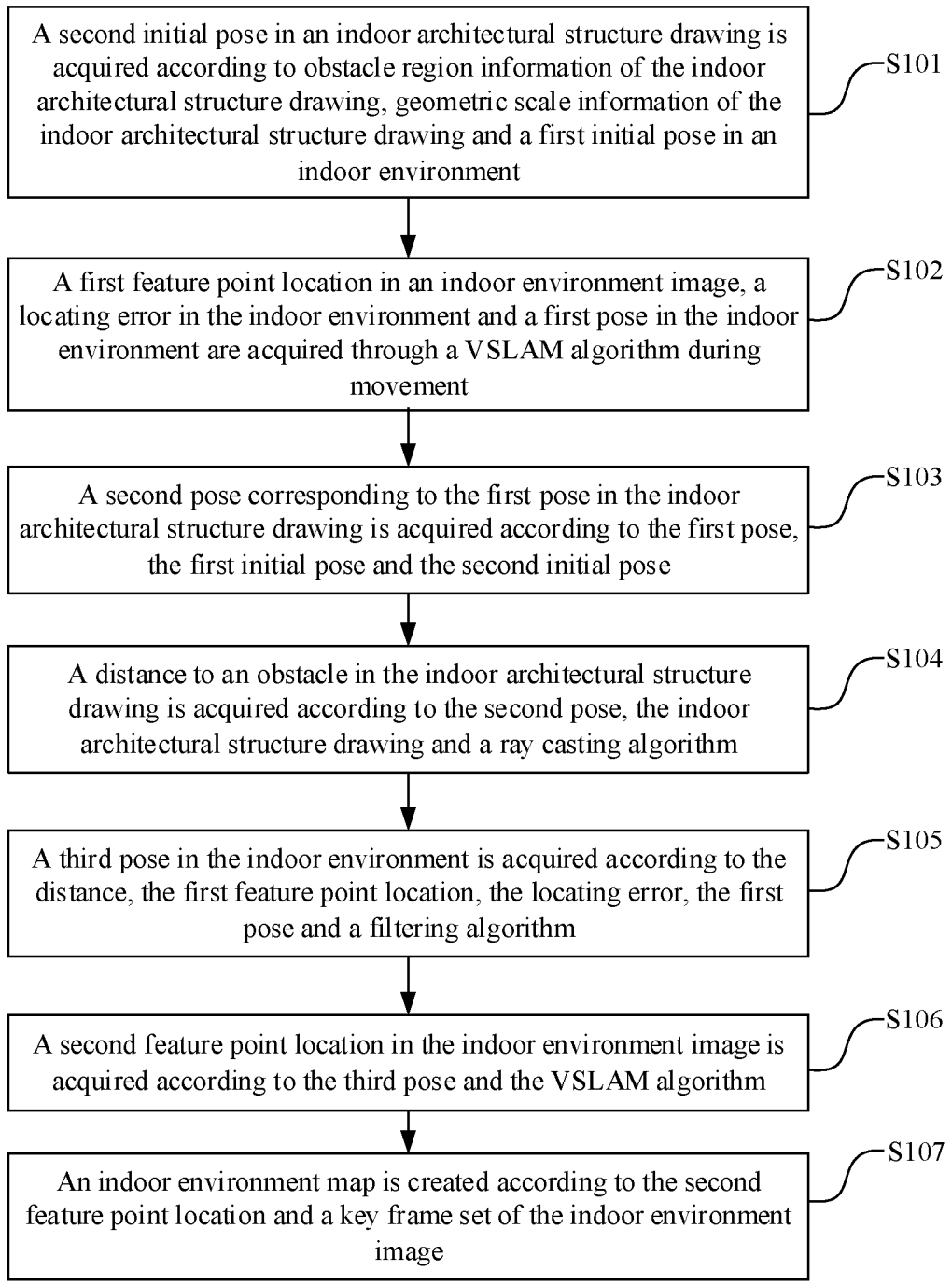
FIG. 1 is a flowchart illustrating a method for creating an indoor environment map according to some embodiments.

The present disclosure provides a method for creating an indoor environment map. FIG. 1 is a flowchart illustrating a method for creating an indoor environment map according to some embodiments. As shown in FIG. 1, the method for creating an indoor environment map is applied to a terminal and includes the following operations S101 to S107. The terminal can also be called User Equipment (UE), a Mobile Station (MS), an MT and the like, and is a device for providing voice and/or data connectivity for a user. For example, the terminal can be a handheld device, vehicle-mounted device, and the like with a wireless connection function. For example, the terminal can be a smart mobile phone, a Pocket Personal Computer (PPC), a palm computer, a Personal Digital Assistant (PDA), a notebook computer, a pad, a wearable device or a vehicle-mounted device, etc. In the present disclosure, the terminal is, for example, a mobile phone.

In the operation S101, a second initial pose of a mobile phone in an indoor building structure drawing is acquired according to obstacle region information of the indoor architectural structure drawing, geometric scale information of the indoor architectural structure drawing and a first initial pose of the mobile phone in an indoor environment.

It is to be noted that the pose mentioned in the embodiments of the application represents both a position and a posture of an object as a whole. The position can be represented by a coordinate such as a three-dimensional coordinate, and the posture can be represented by a rotation matrix, or a quaternion, or an axial angle.

According to some embodiments of the present disclosure, a user can start creating an indoor environment map at any indoor location with the mobile phone capable of executing a VSLAM algorithm. For creating the indoor environment map, the user can manually input an initial pose of the mobile phone in the indoor architectural structure drawing before movement according to the obstacle region information (for example, obstacle-free region boundary information and obstacle region boundary information) of the indoor architectural structure drawing, the geometric scale information (for example, information about a length and a width) of the indoor architectural structure drawing and an initial pose of the mobile phone in the indoor environment.

In the operation S102, a first feature point location in an indoor environment image, a locating error in the indoor environment and a first pose of the mobile phone in the indoor environment are acquired through a VSLAM algorithm during movement.

According to some embodiments of the present disclosure, the VSLAM algorithm is executed at the same time when the user moves with the mobile phone. Based on the VSLAM algorithm, a feature point location in the indoor environment image, a locating error of the mobile phone in the indoor environment and a present pose of the mobile phone in the indoor environment can be obtained.

In the operation S103, a second pose corresponding to the first pose of the mobile phone in the indoor architectural structure drawing is acquired according to the first pose, the first initial pose and the second initial pose.

According to some embodiments of the present disclosure, equal scaling can be performed based on a scale between the indoor architectural structure drawing and a real indoor environment according to the present pose of the mobile phone in the indoor environment, the initial pose of the mobile phone in the indoor environment and the initial pose of the mobile phone in the indoor architectural structure drawing, thereby obtaining the present pose of the mobile phone in the indoor architectural structure drawing.

In the operation S104, a distance to an obstacle in the indoor architectural structure drawing is acquired according to the second pose, the indoor architectural structure drawing and a ray casting algorithm.

According to some embodiments of the present disclosure, a distance from the mobile phone to a surrounding obstacle in the indoor architectural structure drawing is calculated through the ray casting algorithm according to the present pose of the mobile phone in the indoor architectural structure drawing and the obstacle-free region boundary information, obstacle region boundary information and geometric scale information of the indoor architectural structure drawing.

In the operation S105, a third pose of the mobile phone in the indoor environment is acquired according to the distance, the first feature point location, the locating error, the first pose and a filtering algorithm.

According to some embodiments of the present disclosure, an optimized present pose of the mobile phone in the indoor environment is calculated through the filtering algorithm according to the distance from the mobile phone to the surrounding obstacle in the indoor architectural structure drawing, the feature point location in the indoor environment image, the locating error of the mobile phone in the indoor environment and the present pose of the mobile phone in the indoor environment.

In the operation S106, a second feature point location in the indoor environment image is acquired according to the third pose and the VSLAM algorithm.

According to some embodiments of the present disclosure, an optimized location of the feature point in the indoor environment image is calculated through the VSLAM algorithm according to the optimized present pose of the mobile phone in the indoor environment.

In the operation S107, an indoor environment map is created according to a key frame set of the indoor environment image and the second feature point location.

According to some embodiments of the present disclosure, the indoor environment map is created according to the optimized location of the feature point and the key frame set of the indoor environment image.

Figure 2:
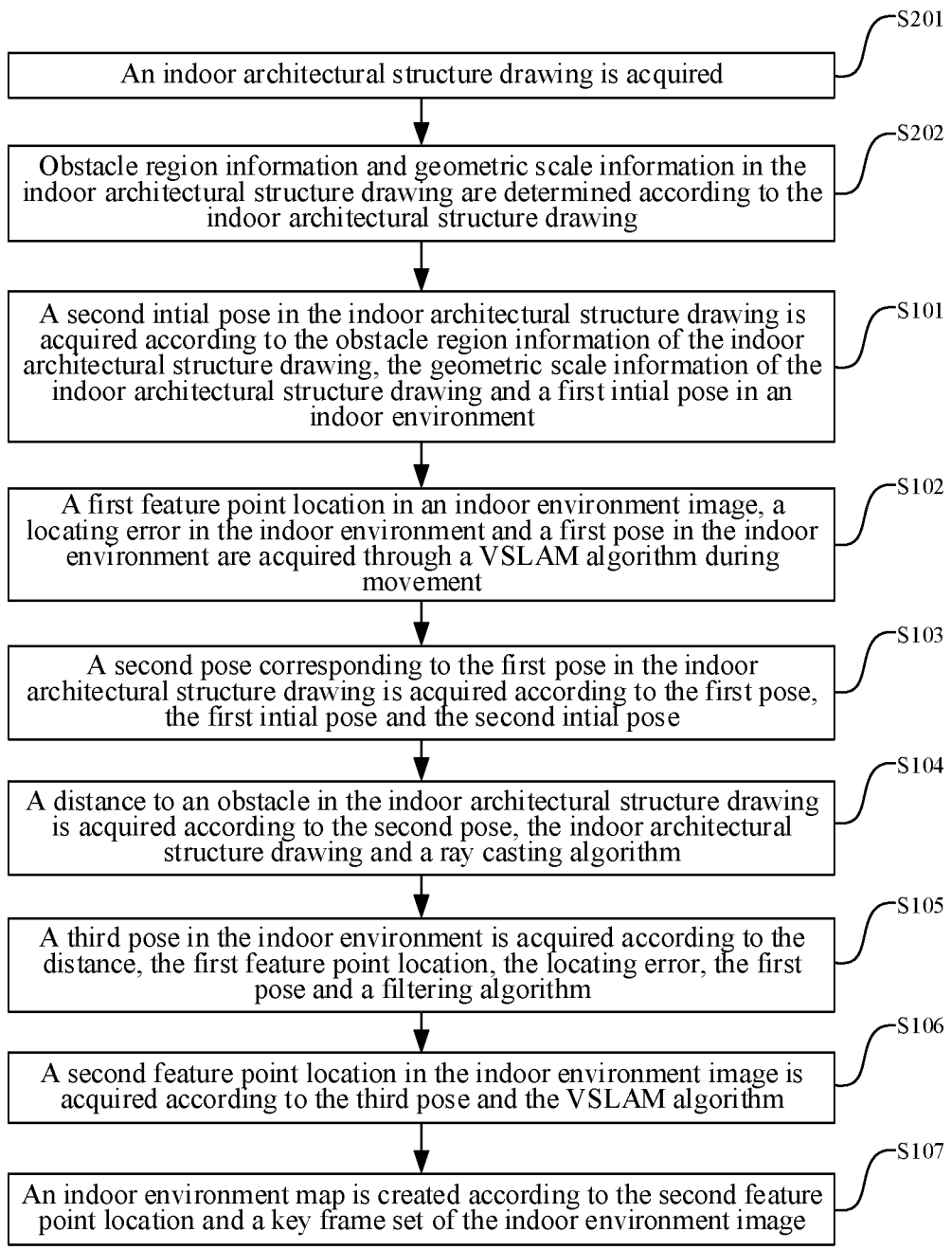
FIG. 2 is a flowchart illustrating still another method for creating an indoor environment map according to some embodiments.

According to some embodiments of the present disclosure, referring to FIG. 2, FIG. 2 is a flowchart illustrating another method for creating an indoor environment map according to some embodiments. As shown in FIG. 2, before the operation S101, the method can include the following operations S201 to S202.

In the operation S201, the indoor architectural structure drawing is acquired.

In the operation S202, the obstacle region information and geometric scale information in the indoor architectural structure drawing are determined according to the indoor architectural structure drawing.

In the embodiment, the obstacle region information includes the obstacle-free region boundary information and the obstacle region boundary information. The obstacle-free region boundary information and the obstacle region boundary information can be determined by manually adjusting the indoor architectural structure drawing. The geometric scale information can be determined by manual input.

Figure 3:
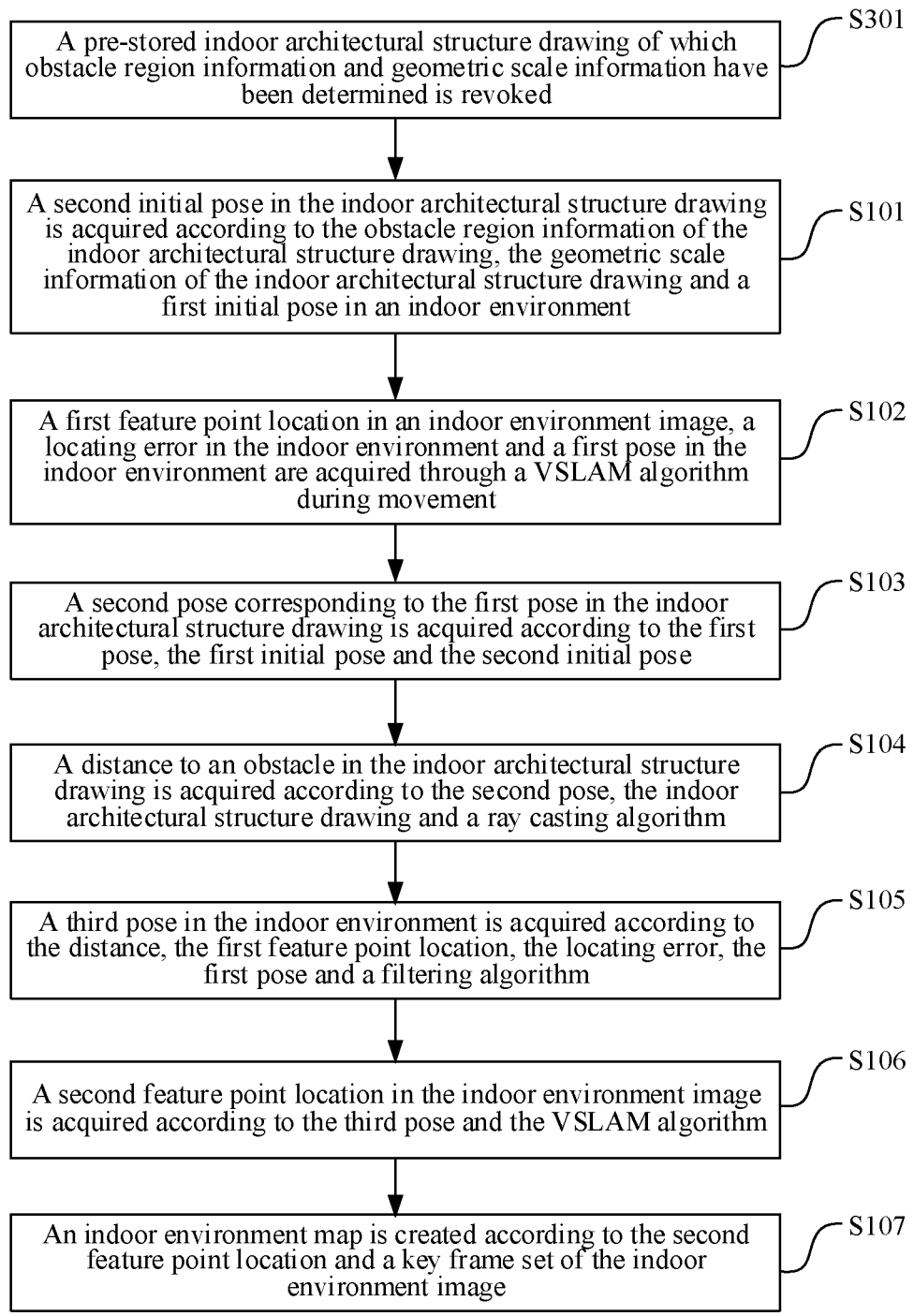
FIG. 3 is a flowchart illustrating yet another method for creating an indoor environment map according to some embodiments.

According to some embodiments of the present disclosure, referring to FIG. 3, FIG. 3 is a flowchart illustrating another method for creating an indoor environment map according to some embodiments. As shown in FIG. 3, before the operation S101, the method can include the following operation S301.

In the operation S301, a pre-stored indoor architectural structure drawing, of which obstacle region information and geometric scale information have been determined, is invoked.

In the embodiment, before the operation S101, the indoor architectural structure drawing pre-stored in the mobile phone is invoked, and the indoor architectural structure drawing has been processed in advance such that the obstacle-free region boundary information, obstacle region boundary information and geometric scale information thereof have been determined.

As shown in FIG. 1 to FIG. 3, in the operation S101, the second initial pose of the mobile phone in the indoor architectural structure drawing is acquired according to the obstacle region information of the indoor architectural structure drawing, the geometric scale information of the indoor architectural structure drawing and the first initial pose of the mobile phone in the indoor environment.

According to some embodiments of the present disclosure, a user can start creating an indoor environment map at any indoor location with a mobile phone capable of executing the VSLAM algorithm. For creating the indoor environment map, the user can manually input an initial pose of the mobile phone in the indoor architectural structure drawing before movement according to obstacle region information (for example, obstacle-free region boundary information and obstacle region boundary information) of the indoor architectural structure drawing, geometric scale information (for example, information about a length and a width) of the indoor architectural structure drawing and an initial pose of the mobile phone in the indoor environment.

In the operation S102, the first feature point location in the indoor environment image, the locating error in the indoor environment and the first pose of the mobile phone in the indoor environment are acquired through the VSLAM algorithm in the movement process.

According to some embodiments of the present disclosure, the VSLAM algorithm is executed at the same time when the user moves with the mobile phone, and through the VSLAM algorithm, the feature point location in the indoor environment image, the locating error of the mobile phone in the indoor environment and the present pose of the mobile phone in the indoor environment can be obtained.

In the embodiment, the VSLAM algorithm includes at least one of an RGBD SLAM algorithm, a monocular VSLAM algorithm, or a binocular VSLAM algorithm. Moreover, for example, when the monocular VSLAM algorithm is used, a feature point of the indoor environment image can be extracted, and the feature point is triangulated to calculate the location of the feature point of the indoor environment image.

In the operation S103, the second pose of the mobile phone corresponding to the first pose of the mobile phone in the indoor architectural structure drawing is acquired according to the first pose, the first initial pose and the second initial pose.

According to some embodiments of the present disclosure, equal scaling can be performed based on the scale between the indoor architectural structure drawing and the real indoor environment according to the present pose of the mobile phone in the indoor environment, the initial pose of the mobile phone in the indoor environment and the initial pose of the mobile phone in the indoor architectural structure drawing, thereby obtaining the present pose of the mobile phone in the indoor architectural structure drawing.

In the embodiment, when the scale between the indoor architectural structure drawing and the real indoor environment is 1:1, the present pose of the mobile phone in the indoor environment is the location of the mobile phone in the indoor architectural structure drawing.

In the operation S104, the distance to the obstacle in the indoor architectural structure drawing is acquired according to the second pose, the indoor architectural structure drawing and the ray casting algorithm.

According to some embodiments of the present disclosure, the distance from the mobile phone to the surrounding obstacle in the indoor architectural structure drawing is calculated through the ray casting algorithm according to the corresponding present pose of the mobile phone in the indoor architectural structure drawing and the obstacle-free region boundary information, obstacle region boundary information and geometric scale information of the indoor architectural structure drawing.

In the operation S105, the third pose of the mobile phone in the indoor environment is acquired according to the distance, the first feature point location, the locating error, the first pose and the filtering algorithm.

According to some embodiments of the present disclosure, the optimized present pose of the mobile phone in the indoor environment is calculated through the filtering algorithm according to the distance from the mobile phone to the surrounding obstacle in the indoor architectural structure drawing, the feature point location in the indoor environment image, the locating error of the mobile phone in the indoor environment and the present pose of the mobile phone in the indoor environment.

In the embodiment, combination of the known indoor architectural structure drawing with the VSLAM algorithm is implemented through the filtering algorithm.

In the embodiment, the filtering algorithm includes at least one of a Kalman filtering algorithm, an extended Kalman filtering algorithm, or a particle filtering algorithm. For example, the filtering algorithm can be the particle filtering algorithm, and thus the distance, the feature point location, the locating error and the present pose are used as input of the particle filtering algorithm, and output is the filtered-optimized present pose of the mobile phone.

In the operation S106, the second feature point location in the indoor environment image is acquired according to the third pose and the VSLAM algorithm.

According to some embodiments of the present disclosure, the optimized location of the feature point of the indoor environment image is calculated through the VSLAM algorithm according to the optimized present pose of the mobile phone in the indoor environment. As described in the operation S102, when the monocular VSLAM algorithm is used, the feature point of the indoor environment image can be extracted, and the feature point is triangulated to calculate the location of the feature point in the indoor environment image.

In the operation S107, the indoor environment map is created according to the second feature point location and the key frame set of the indoor environment image.

According to some embodiments of the present disclosure, the indoor environment map is created according to the optimized location of the feature point and the key frame set of the indoor environment image.

In the embodiment, the key frame set can be a set formed by at least one key frame selected through the VSLAM algorithm.

Figure 4:
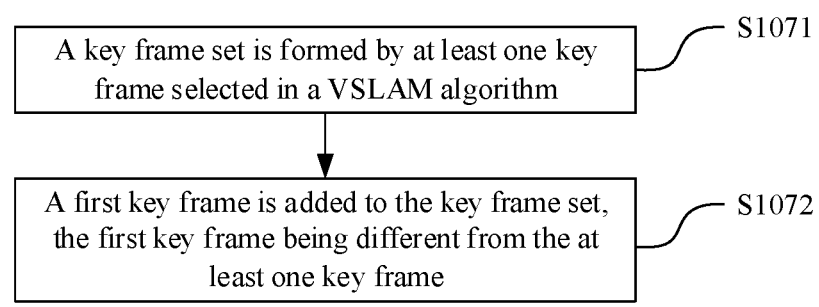
FIG. 4 is a flowchart illustrating determination of a key frame according to some embodiments.

According to some embodiments of the present disclosure, referring to FIG. 4, FIG. 4 is a flowchart illustrating determination of a key frame according to some embodiments. As shown in FIG. 4, the method can further include the following operations S1071 to S1072. In the operation S1071, the key frame set is formed by the at least one key frame selected through the VSLAM algorithm. In the operation S1072, a first key frame is added to the key frame set, the first key frame being different from the at least one key frame.

In the embodiment, the key frame set can be a set formed by the at least one key frame selected through the VSLAM algorithm, and a key frame can be added to the key frame set, the added key frame being different from the at least one key frame selected through the VSLAM algorithm. In addition, adding an important key frame (for example, a key frame involved in a complex environment such as making a turn and the like) can further ensure robustness when the map is subsequently adopted for navigation and locating. The method can further include that a key frame in the key frame set is deleted, for example, an inaccurate or useless key frame can be removed. Addition or deletion of a key frame can be manually carried out or automatically implemented through a key frame selection algorithm.

In addition, in the present disclosure, after the operation S107, the method can further include that: whether the user goes through all obstacle-free regions with the mobile phone or not is determined according to the known indoor architectural structure drawing. In a case that the user has gone through all the obstacle-free regions, it is indicated that creation of the indoor environment map has been completed; while in a case that the user has not yet gone through all the obstacle-free regions, S102 is re-executed to restart. Determining whether the user goes through all the obstacle-free regions or not can be implemented by the user according to the indoor architectural structure drawing or automatically implemented by executing, through the mobile phone, a known automatic recognition algorithm according to the indoor architectural structure drawing.

Some embodiments of the present disclosure also provide a device for creating an indoor environment map through a VSLAM algorithm.

It can be understood that, for realizing the abovementioned functions, the device provided in the embodiment of the present disclosure for creating an indoor environment map through the VSLAM algorithm can include hardware structures and/or software modules capable of executing each function. In combination with portions and algorithm steps of each example disclosed in the embodiments of the present disclosure, the embodiments of the present disclosure can be implemented by hardware or a combination of hardware and computer software. Whether a function is executed by hardware or by driving hardware through computer software depends on specific applications and design constraints of the technical solutions. Those skilled in the art can realize the described functions for each specific application through different methods, but such realization shall fall within the scope of the technical solutions of the embodiments of the present disclosure.

The embodiment provides a device for creating an indoor environment map. The device is configured to execute the operations in the method embodiments.

Figure 5:
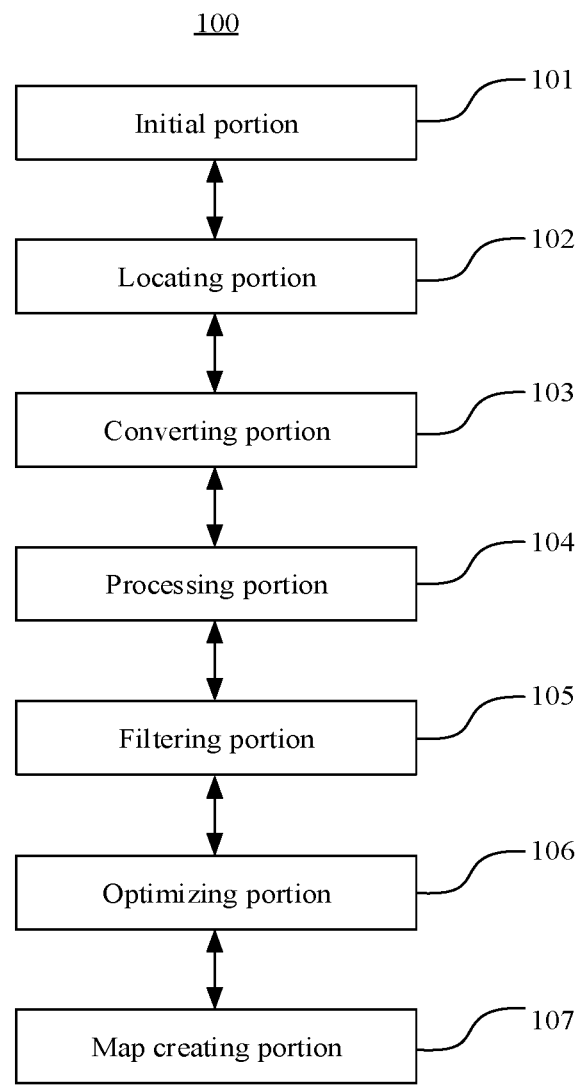
FIG. 5 is a block diagram of a device for creating an indoor environment map according to some embodiments.

FIG. 5 is a block diagram of device 100 for creating an indoor environment map according to some embodiments. As shown in FIG. 5, the device includes an initial portion 101, a locating portion 102, a converting portion 103, a processing portion 104, a filtering portion 105, an optimizing portion 106 and a map creating portion 107. The initial portion 101 is configured to acquire a second initial pose of a mobile phone in an indoor architectural structure drawing according to obstacle region information of the indoor architectural structure drawing, geometric scale information of the indoor architectural structure drawing and a first initial pose of the mobile phone in an indoor environment. The locating portion 102 is configured to acquire a first feature point location in an indoor environment image, a locating error in the indoor environment and a first pose of the mobile phone in the indoor environment through a VSLAM algorithm during movement. The converting portion 103 is configured to acquire a second pose corresponding to the first pose of the mobile phone in the indoor architectural structure drawing according to the first pose, the first initial pose and the second initial pose. The processing portion 104 is configured to acquire a distance to an obstacle in the indoor architectural structure drawing according to the second pose, the indoor architectural structure drawing and a ray casting algorithm. The filtering portion 105 is configured to acquire a third pose of the mobile phone in the indoor environment according to the distance, the first feature point location, the locating error, the first pose and a filtering algorithm. The optimizing portion 106 is configured to acquire a second feature point location in the indoor environment image according to the third pose and the VSLAM algorithm. The map creating portion 107 is configured to create an indoor environment map according to the second feature point location and a key frame set of the indoor environment image.

In an aspect, the key frame set can be a set formed by at least one key frame selected through the VSLAM algorithm.

In another aspect, the device can further include: a key frame processing portion, configured to add a first key frame to the key frame set, the first key frame being different from the at least one key frame.

In another aspect, the VSLAM algorithm can include at least one of an RGBD SLAM algorithm, a monocular VSLAM algorithm, or a binocular VSLAM algorithm.

In another aspect, the VSLAM algorithm can include the monocular VSLAM algorithm, and the locating portion 102 is configured to extract a feature point from the indoor environment image and triangulate the feature point to calculate the first feature point location.

In another aspect, the filtering algorithm can include at least one of a Kalman filtering algorithm, an extended Kalman filtering algorithm, or a particle filtering algorithm.

Figure 6:
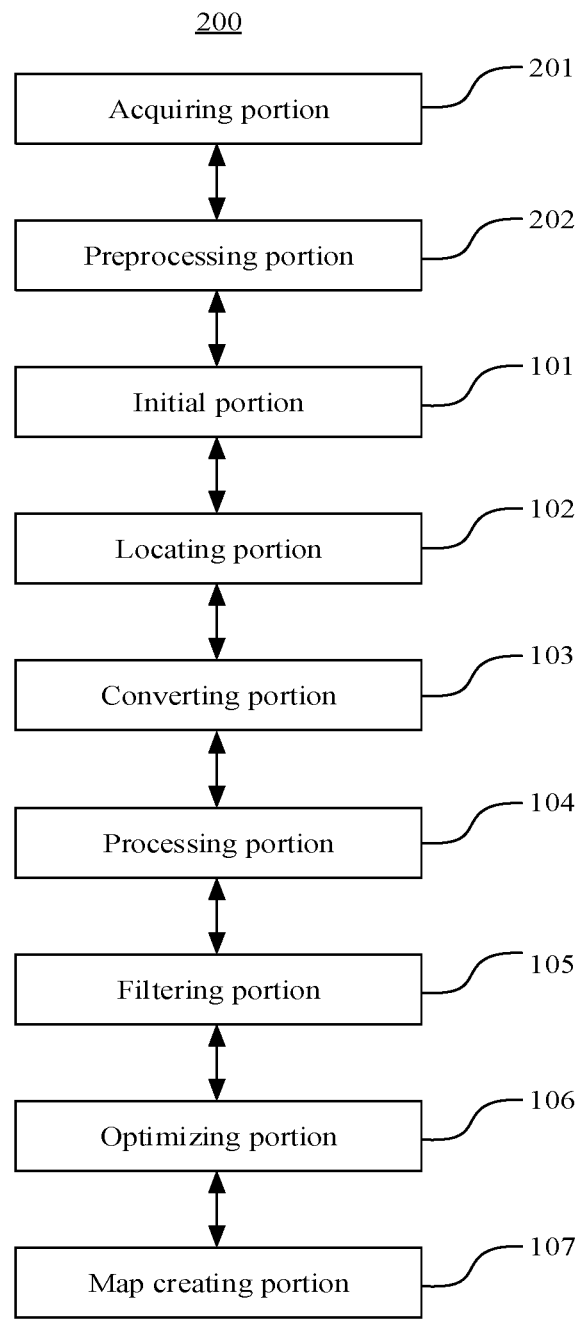
FIG. 6 is a block diagram of still another device for creating an indoor environment map according to some embodiments.

According to some embodiments of the present disclosure, FIG. 6 is a block diagram of still another device 200 for creating an indoor environment map according to some embodiments. The only difference between the device 200 shown in FIG. 6 and the device 100 shown in FIG. 5 is that the device 200 further includes an acquiring portion 201 and a preprocessing portion 202. The acquiring portion 201 is configured to acquire the indoor architectural structure drawing. The preprocessing portion 202 is configured to determine the obstacle region information and geometric scale information in the indoor architectural structure drawing according to the indoor architectural structure drawing.

Figure 7:
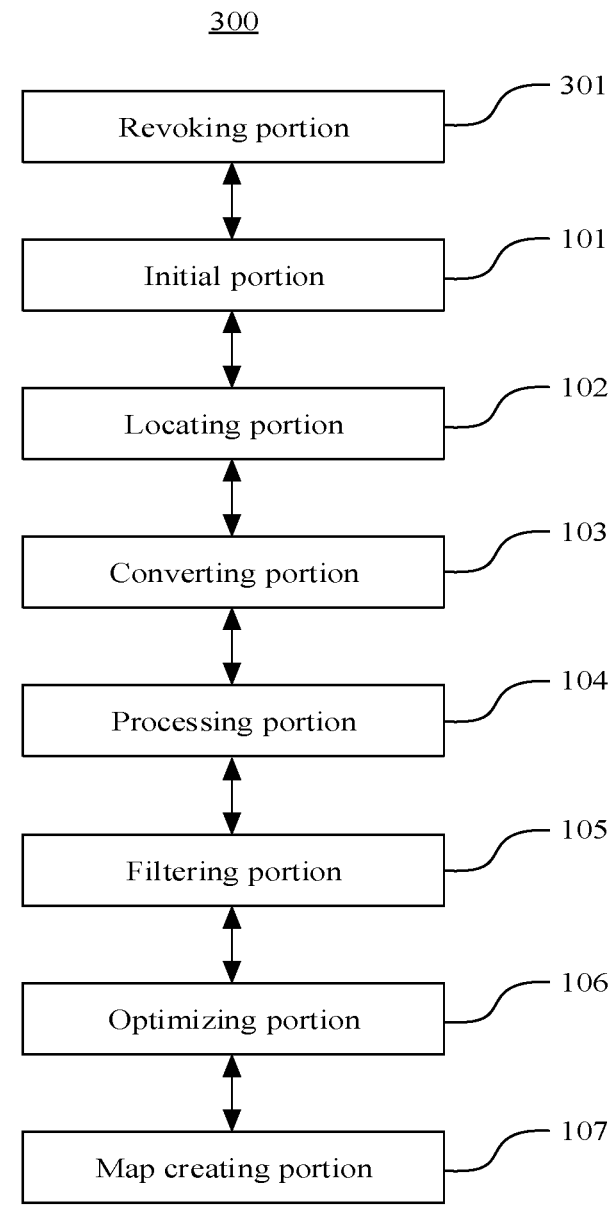
FIG. 7 is a block diagram of yet another device for creating an indoor environment map according to some embodiments.

According to some embodiments of the present disclosure, FIG. 7 is a block diagram of yet another device 300 for creating an indoor environment map according to some embodiments. The only difference between the device 300 shown in FIG. 7 and the device 100 shown in FIG. 1 is that the device 300 further includes a invoking portion 301. The invoking portion 301 is configured to invoke a pre-stored indoor architectural structure drawing of which obstacle region information and geometric scale information have been determined.

Figure 8:
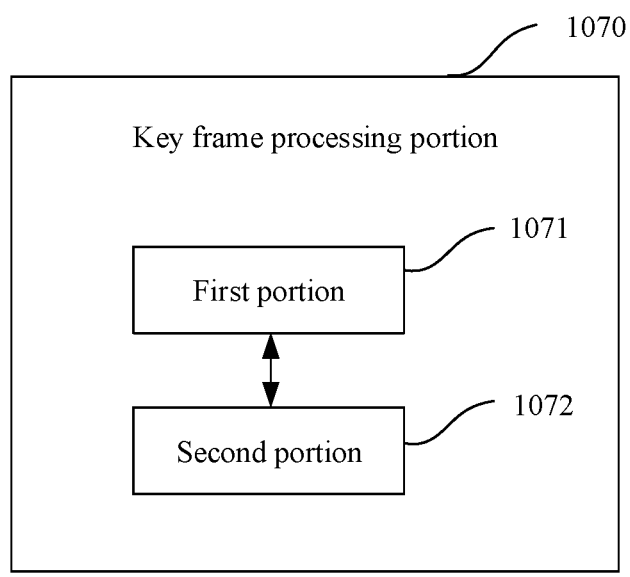
FIG. 8 is a block diagram of a key frame processing portion according to some embodiments.

According to some embodiments of the present disclosure, FIG. 8 is a block diagram of a key frame processing portion according to some embodiments. As shown in FIG. 8, the key frame processing portion 1070 includes a first portion and a second portion, the first portion is configured to form the key frame set by the at least one key frame selected through the VSLAM algorithm, and the second portion is configured to add a first key frame to the key frame set, the first key frame being different from the at least one key frame.

It may be understood that, the specific manners for performing operations for individual portions of the devices in the above embodiments have been described in detail in the embodiments of the method, which will not be elaborated herein.

Figure 9:
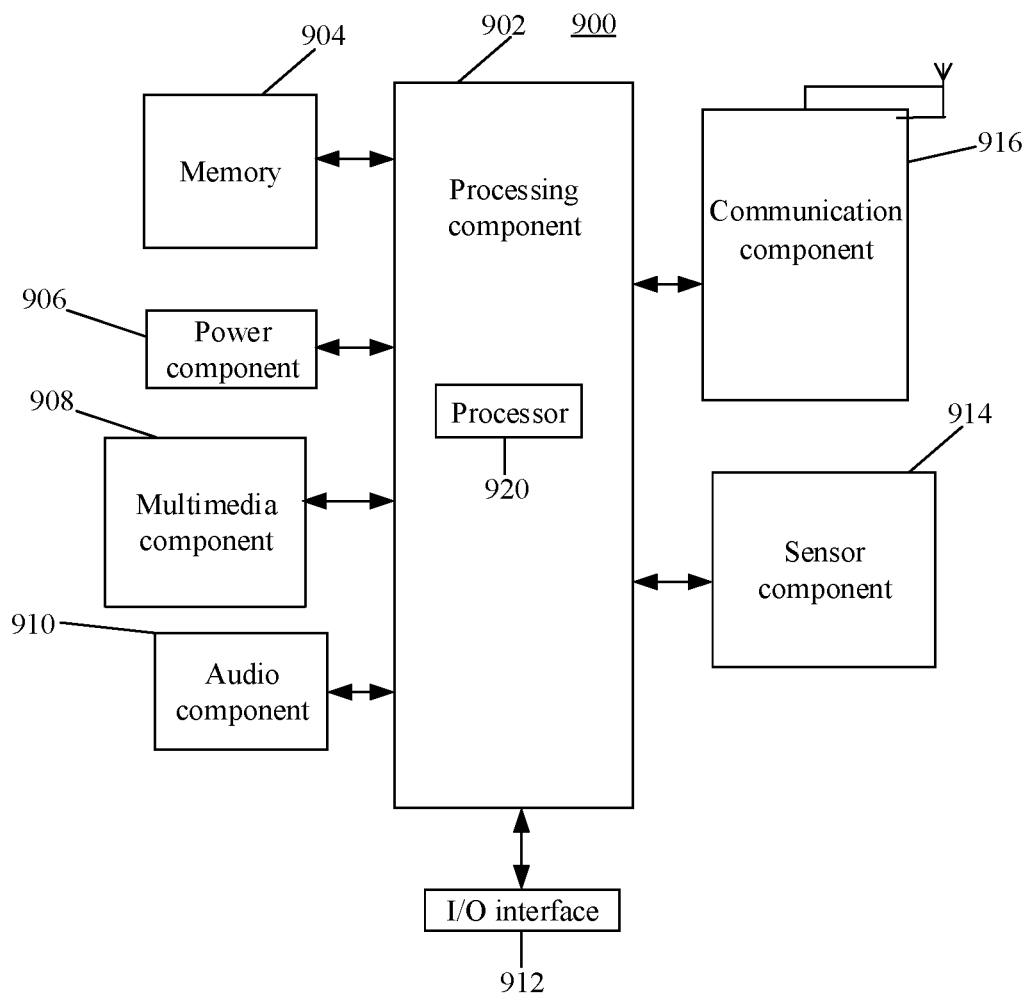
FIG. 9 is a block diagram of yet another device for creating an indoor environment map according to some embodiments.

Some embodiments of the present disclosure also provide a device 900 for creating an indoor environment map through a VSLAM algorithm. FIG. 9 is a block diagram of a device 900 for creating an indoor environment map through a VSLAM algorithm according to some embodiments. For example, the device 900 can be a mobile phone, a computer, a tablet, a PDA and the like.

Referring to FIG. 9, the device 900 can include one or more of the following components: a processing component 902, a memory 904, a power component 906, a multimedia component 908, an audio component 910, an Input/Output (I/O) interface 912, a sensor component 914, and a communication component 916.

The processing component 902 typically is configured to control overall operations of the device 900, such as the operations associated with display, telephone calls, data communications, camera operations, and recording operations. The processing component 902 can include one or more processors 920 to execute instructions to perform all or part of the steps in the above method. Moreover, the processing component 902 can include one or more modules which facilitate interaction between the processing component 902 and other components. For instance, the processing component 902 can include a multimedia module to facilitate interaction between the multimedia component 908 and the processing component 902.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The memory 904 is configured to store various types of data to support the operation of the device 900. Examples of such data include instructions for any application programs or methods operated on the device 900, contact data, phonebook data, messages, pictures, video, etc. The memory 904 can be implemented by any type of volatile or non-volatile memory devices, or any combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 906 is configured to provide power for various components of the device 900. The power component 906 can include a power management system, one or more power supplies, and other components associated with generation, management and distribution of power for the device 900.

The multimedia component 908 can include a screen for providing an output interface between the device 900 and a user. In some examples, the screen can include a Liquid Crystal Display (LCD) and a Touch Panel (TP). In some embodiments, organic light-emitting diode (OLED) or other types of displays can be employed. If the screen includes the TP, the screen can be implemented as a touch screen to receive an input signal from the user. The TP includes one or more touch sensors to sense touches, swipes and gestures on the TP. The touch sensors can not only sense a boundary of a touch or swipe action but also detect a duration and pressure associated with the touch or swipe action. In some examples, the multimedia component 908 includes a front camera and/or a rear camera. The front camera and/or the rear camera can receive external multimedia data when the device 900 is in an operation mode, such as a photographing mode or a video mode. Each of the front camera and the rear camera can be a fixed optical lens system or have focusing and optical zooming capabilities.

The audio component 910 is configured to output and/or input an audio signal. For example, the audio component 910 includes a Microphone (MIC), and the MIC is configured to receive an external audio signal when the device 900 is in the operation mode, such as a call mode, a recording mode and a voice recognition mode. The received audio signal can further be stored in the memory 904 or sent through the communication component 916. In some examples, the audio component 910 can further include a speaker configured to output the audio signal.

The I/O interface 912 is configured to provide an interface between the processing component 902 and a peripheral interface module, and the peripheral interface module can be a keyboard, a click wheel, a button and the like. The button can include, but not limited to: a home button, a volume button, a starting button and a locking button.

The sensor component 914 can include one or more sensors configured to provide status assessment in various aspects for the device 900. For instance, the sensor component 914 can detect an on/off status of the device 900 and relative positioning of components, such as a display and small keyboard of the device 900, and the sensor component 914 can further detect a change in a location of the device 900 or a component of the device 900, presence or absence of contact between the user and the device 900, orientation or acceleration/deceleration of the device 900 and a change in temperature of the device 900. The sensor component 914 can include a proximity sensor configured to detect presence of an object nearby without any physical contact. The sensor component 914 can also include a light sensor, such as a Complementary Metal Oxide Semiconductor (CMOS) or Charge Coupled Device (CCD) image sensor, configured for use in an imaging APP. In some examples, the sensor component 914 can also include an acceleration sensor, a gyroscope sensor, a magnetic sensor, a pressure sensor or a temperature sensor.

The communication component 916 is configured to facilitate wired or wireless communication between the device 900 and other equipment. The device 900 can access a communication-standard-based wireless network, such as a Wireless Fidelity (Wi-Fi) network, a 3rd-Generation (3G), $4^{th}$-Generation (4G), or $5^{th}$-Generation (5G) network or a combination thereof. In some embodiments, the communication component 916 receives a broadcast signal or broadcast associated information from an external broadcast management system through a broadcast channel. In some embodiments, the communication component 916 further includes a Near Field Communication (NFC) module to facilitate short-range communication. For example, the NFC module can be implemented based on a Radio Frequency Identification (RFID) technology, an Infrared Data Association (IrDA) technology, an Ultra-WideBand (UWB) technology, a Bluetooth (BT) technology and another technology.

In some embodiments, the device 900 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium including an instruction, such as the memory 904 including an instruction, and the instruction can be executed by the processor 920 of the device 900 to implement the abovementioned method. For example, the non-transitory computer-readable storage medium can be a ROM, a Random-Access Memory (RAM), a Compact Disc Read-Only Memory (CD-ROM), a magnetic tape, a floppy disc, an optical data storage device and the like.

A non-transitory computer-readable storage medium can have instructions stored thereon, which executable by a processor of a terminal to enable the terminal to execute the methods of the embodiments described above.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the claims.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method of creating an indoor environment map, applied to a terminal and comprising:
    acquiring a second initial pose of the terminal in an indoor architectural structure drawing according to obstacle region information of the indoor architectural structure drawing, geometric scale information of the indoor architectural structure drawing and a first initial pose of the terminal in an indoor environment;
    acquiring a first feature point location in an indoor environment image, a locating error in the indoor environment and a first pose of the terminal in the indoor environment through a Visual Simultaneous Location and Mapping (VSLAM) algorithm during movement;
    acquiring a second pose of the terminal corresponding to the first pose of the terminal in the indoor architectural structure drawing according to the first pose, the first initial pose and the second initial pose;
    acquiring a distance to an obstacle in the indoor architectural structure drawing according to the second pose, the indoor architectural structure drawing and a ray casting algorithm;
    acquiring a third pose of the terminal in the indoor environment according to the distance, the first feature point location, the locating error, the first pose and a filtering algorithm;
    acquiring a second feature point location in the indoor environment image according to the third pose and the VSLAM algorithm; and
    creating an indoor environment map according to the second feature point location and a key frame set of the indoor environment image.

2. The method of claim 1, wherein the key frame set is a set formed by at least one key frame selected through the VSLAM algorithm.

3. The method of claim 2, further comprising:
    adding a first key frame to the key frame set,
    wherein the first key frame is different from the at least one key frame.

4. The method of claim 1, wherein the VSLAM algorithm comprises at least one of a Red Green Blue-Depth (RGBD) VSLAM algorithm, a monocular VSLAM algorithm, or a binocular VSLAM algorithm.

5. The method of claim 4, wherein the VSLAM algorithm comprises the monocular VSLAM algorithm;
    acquiring the first feature point location in the indoor environment image, the locating error in the indoor environment and the first pose of the terminal in the indoor environment through the VSLAM algorithm during movement comprises:
        extracting a feature point from the indoor environment image; and
        triangulating the feature point to calculate the first feature point location.

6. The method of claim 1, wherein the filtering algorithm comprises at least one of a Kalman filtering algorithm, an extended Kalman filtering algorithm, or a particle filtering algorithm.

7. A device configured to create an indoor environment map, comprising:
    a processor; and
    a memory configured to store an instruction executable by the processor,
    wherein the processor is configured to execute steps of:
    acquiring a second initial pose of a terminal in an indoor architectural structure drawing according to obstacle region information of the indoor architectural structure drawing, geometric scale information of the indoor architectural structure drawing and a first initial pose of the terminal in an indoor environment;
    acquiring a first feature point location in an indoor environment image, a locating error in the indoor environment and a first pose of the terminal in the indoor environment through a Visual Simultaneous Location and Mapping (VSLAM) algorithm during movement;
    acquiring a second pose of the terminal corresponding to the first pose of the terminal in the indoor architectural structure drawing according to the first pose, the first initial pose and the second initial pose;
    acquiring a distance to an obstacle in the indoor architectural structure drawing according to the second pose, the indoor architectural structure drawing and a ray casting algorithm;
    acquiring a third pose of the terminal in the indoor environment according to the distance, the first feature point location, the locating error, the first pose and a filtering algorithm;
    acquiring a second feature point location in the indoor environment image according to the third pose and the VSLAM algorithm; and
    creating an indoor environment map according to the second feature point location and a key frame set of the indoor environment image.

8. The device of claim 7, wherein the key frame set is a set formed by at least one key frame selected through the VSLAM algorithm.

9. The device of claim 8, wherein the processor is further configured to execute a step of: adding a first key frame to the key frame set, wherein the first key frame is different from the at least one key frame.

10. The device of claim 7, wherein the VSLAM algorithm comprises at least one of a Red Green Blue-Depth (RGBD) VSLAM algorithm, a monocular VSLAM algorithm, or a binocular VSLAM algorithm.

11. The device of claim 10, wherein the VSLAM algorithm comprises the monocular VSLAM algorithm, and the processor is further configured to execute steps of:
    extracting a feature point from the indoor environment image; and
    triangulating the feature point to calculate the first feature point location.

12. The device of claim 7, wherein the filtering algorithm comprises at least one of a Kalman filtering algorithm, an extended Kalman filtering algorithm, or a particle filtering algorithm.

13. A non-transitory computer-readable storage medium having instructions stored thereon for execution by a processor of a mobile terminal to enable the mobile terminal to execute the method for creating an indoor environment map of claim 1.

14. The non-transitory computer-readable storage medium of claim 13, wherein the key frame set is a set formed by at least one key frame selected through the VSLAM algorithm.

15. The non-transitory computer-readable storage medium of claim 14, wherein the processor further enables the mobile terminal to execute operations of:
adding a first key frame to the key frame set,
wherein the first key frame is different from the at least one key frame.

16. The non-transitory computer-readable storage medium of claim 13, wherein the VSLAM algorithm comprises at least one of a Red Green Blue-Depth (RGBD) VSLAM algorithm, a monocular VSLAM algorithm, or a binocular VSLAM algorithm.

17. The non-transitory computer-readable storage medium of claim 16, wherein the VSLAM algorithm comprises the monocular VSLAM algorithm;
the processor further enables the mobile terminal to execute operations of:
extracting a feature point from the indoor environment image; and
triangulating the feature point to calculate the first feature point location.

18. The non-transitory computer-readable storage medium of claim 13, wherein the filtering algorithm comprises at least one of a Kalman filtering algorithm, an extended Kalman filtering algorithm, or a particle filtering algorithm.

19. The non-transitory computer-readable storage medium of claim 14, wherein the filtering algorithm comprises at least one of a Kalman filtering algorithm, an extended Kalman filtering algorithm, or a particle filtering algorithm.

20. The non-transitory computer-readable storage medium of claim 15, wherein the filtering algorithm comprises at least one of a Kalman filtering algorithm, an extended Kalman filtering algorithm, or a particle filtering algorithm.

* * * * *